United States Patent Office 3,517,913
Patented June 30, 1970

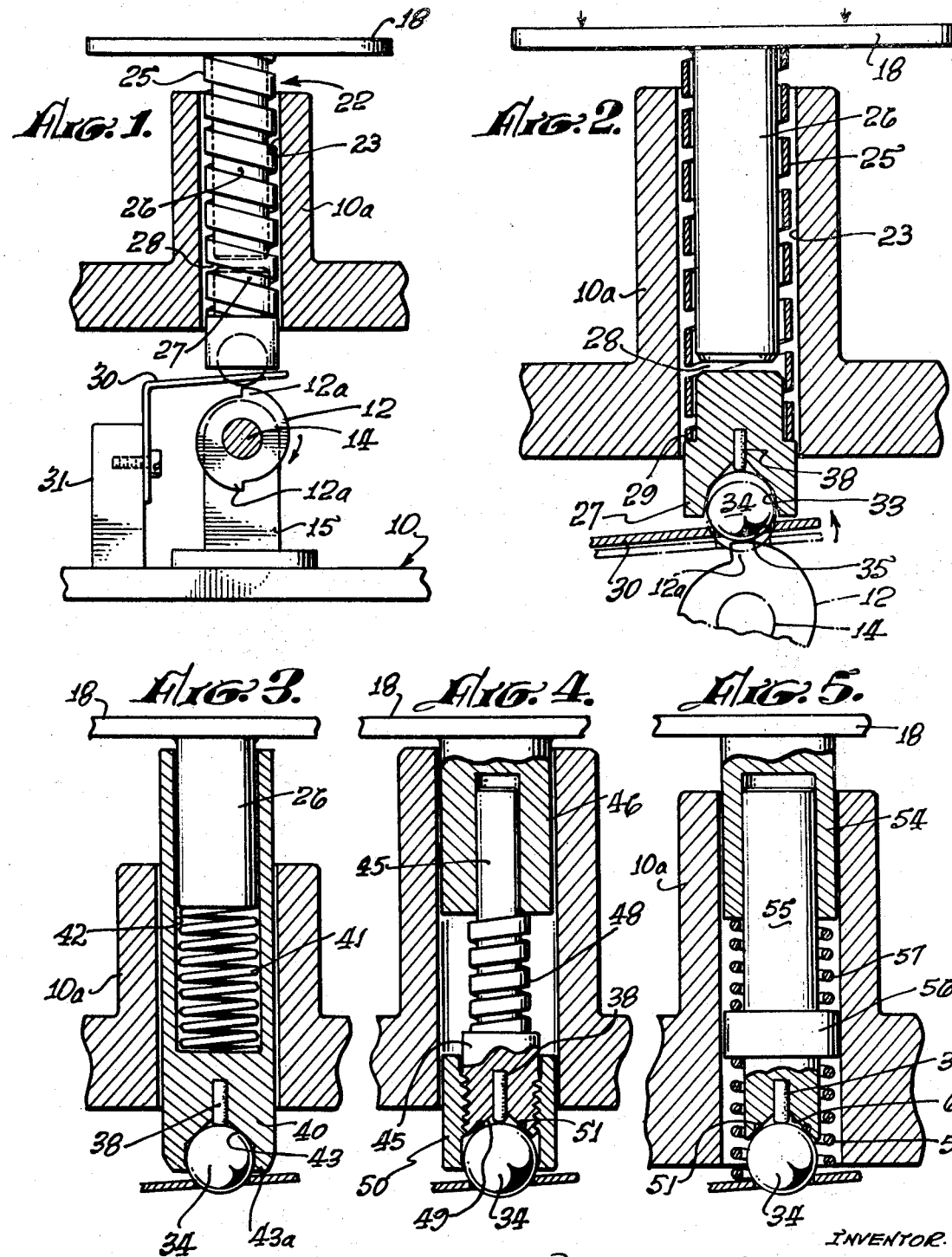

3,517,913
VIBRATING TABLE CONSTRUCTION
Walter J. van Rossem, 1917 Thayer Ave.,
Los Angeles, Calif. 90025
Filed Oct. 23, 1968, Ser. No. 769,976
Int. Cl. B01f *11/00*
U.S. Cl. 259—91         9 Claims

ABSTRACT OF THE DISCLOSURE

A vibrating table is supported on an elastic column, motion for vibrating the table being imparted to the base of the column by a rotating cam. A cantilever type leaf spring supports the column and table out of contact with the cam, when at rest. Downward pressure on the table brings the column into contact with the rotating cam. Anti-friction means in the form of a captive ball bearing are located at the base of the column to reduce friction and improve the life of moving parts.

BACKGROUND OF THE INVENTION

The present invention relates generally to vibrating or shaking tables and more especially to improvements in a vibrating table that is particularly suitable for use in the field of investment casting. The subject matter of this invention is in the nature of an improvement on the construction of a vibrating table illustrated and claimed in my Pat. No. 3,211,432, issued Oct. 12, 1965, to which reference may be made for further details.

In the vibrating table construction disclosed in the patent, a cantilever type leaf spring holds the vibrating table and the elastic column in a normal rest position out of contact with the rotating cam. The leaf spring is deflected downwardly into engagement with the cam when it is desired to vibrate the table. As a consequence, considerable wear occurs between the cam and the leaf spring as the cam slides over the surface of the spring.

The wearing surfaces are not susceptible of satisfactory lubrication. A thin or light lubricating oil tends to be thrown off the surfaces or evaporated by the heat generated. Solution of this problem by using a heavier oil or grease raises other problems in that the grease then becomes sticky and collects foreign particles, especially particles of the powdered investment material which is highly abrasive, and the result is a compound which facilitates rather than reduces wear on these relatively moving surfaces.

Thus, it becomes a general object of the present invention to provide an improved construction for the leaf spring and the elastic column which eliminates wear on the leaf spring. The cam and ball bearing are normally made of tempered steel. Stainless steel of modern formulas may be used in the presence of corrosive material.

It is also an object of the present invention to provide an improved construction characterized by low friction of the moving parts and long life for the parts as a consequence of reduced wear.

A more specific object of the present invention is to add to the base of the elastic column suitable anti-friction means which result in a low friction contact with the rotating cam without any sacrifice in smooth operation of the device.

SUMMARY OF THE INVENTION

These objects of the present invention are achieved in a vibrating table construction having a table, a rotating cam and elastic column means transmitting motion from the cam to the table by providing on the elastic column a ball held in a socket in the base of the column means and seat means on the leaf spring which engages the ball to support the column means but allows the ball to project through and beyond the leaf spring in order to engage the rotating cam.

As a consequence of this construction, the rotating cam does not engage and wear the leaf spring, contact with the cam being limited to rolling contact of the ball on the cam. By providing the column means at its base with a socket that has a tapered or hemispherical bottom wall, contact between the ball and the column is rolling and is limited to a small area of contact, or even to essentially line contact, with the result that friction and wear between the moving parts are greatly reduced. The socket encloses the ball sufficiently to shield it from accumulating foreign material of an abrasive character; and the socket also provides a holder for a source of lubrication, typically in the form of an oil wick at the base of the socket.

In a preferred form of the invention, the socket may be provided with a cushion pad in the form of an elastic ring such that the ball engages the ring rather than the metal walls of the socket to cushion the shock of motion imparted to the table during the initial period of vibrating the table.

BRIEF DESCRIPTION OF THE DRAWING

How the above objects and advantages of my invention, as well as others not specifically referred to herein, are attained will be more readily understood by reference to the following description and to the annexed drawing, in which:

FIG. 1 is a combined partial elevation and vertical section through an elastic column supporting a vibrating table, illustrating a preferred embodiment of the column and anti-friction means at the base of the column;

FIG. 2 is an enlarged fragmentary vertical median section illustrating the anti-friction means in greater detail; and FIGS. 3, 4, and 5 are fragmentary vertical sections through the elastic column illustrating variational constructions of the column and the anti-friction means carried thereby.

DESCRIPTION OF A PREFERRED EMBODIMENT

Referring now to the drawing, and more particularly to FIG. 1, it will be seen that the vibrating table comprises a frame, indicated generally at 10. Only fragments of the frame are illustrated here since any suitable type of suporting frame or structure may be provided for the purpose of mounting in one assembly the various parts necessary to vibrate the table. Rotating cam 12 is rigidly mounted in any suitable manner on shaft 14, the shaft being rotatably mounted upon frame 10 by any suitable type of bearing structure, as for example one or more pedestal bearings 15. It is contemplated that shaft 14 will be driven by a suitable prime mover, for example an electric motor, not shown in the drawing. Shaft 14 can be connected directly to such a motor, or it can be driven through an intervening speed reducing arrangement, such as a gear box, chain and sprocket, or belt pulley drive. Such arrangements are sufficiently well known in the art that they need no explanation or illustration here.

Cam 12 is assumed to rotate in a clockwise direction, viewed in FIG. 1. The cam is provided with two lobes 12*a*, each of which has a gently rising surface on the leading face and a sharp drop on the trailing face. This configuration of the cam is merely exemplary of cam constructions that may be used, as any other suitable configuration may likewise be used.

The vibrating table is indicated at 18 and it has an upper surface for supporting a flask or other object thereon as illustrated in my patent referred to above. Table 18 is reciprocated vertically by motion which is imparted to the table through the elastic column means indicated generally at 22, the elastic column serving to transmit motion from the rotating cam to the table, as will be more readily apparent. The elastic column is located in a bore 23 in guide 10a which is a stationary portion of frame 10. Bore 23 serves not only to laterally confine the elastic column means, for reasons which will be further explained, but also serves to position the column with the axis thereof in a vertical position directly above cam 12, the column being free to move axially thereof in a vertical direction within bore 23 in guide 10a.

Elastic column means 22 include a helical coil spring 25. This spring may be wound from a wire of circular cross section, but it is preferred that it be wound of stock that is rectangular in cross section, as shown in FIGS. 1 and 2. This spring compresses axially from the expanded position of FIG. 1 to the position of FIG. 2 when the table is being vibrated. The turns have large enough diameter that there is a central bore within the spring which slidably receives stem 26 attached in any suitable manner to the underside of table 18 and extending downwardly within spring 25. The upper end of spring 25 bears against the underside of table 18 and may or may not be attached to the table.

Within the lower portion of spring 25 is a second stem section 27 which is normally spaced from the upper stem section 26, as indicated at 28. Stem 27 has an enlarged lower end which provides an upwardly facing shoulder 29 upon which the lower end of spring 25 rests. The coils of spring 25 are free to move relative to the stem sections 26 and 27 within the spring.

Lower stem 27 is spaced above leaf spring 30 which is attached to post 31 in any suitable manner, the post being a portion of frame 10.

The lower end of stem section 27 has a downwardly facing concave recess or socket 33 which is adapted to receive ball 34 on which the elastic column rests. Ball 34 rests on leaf spring 30 and is seated in an opening 35 in leaf spring 30, the diameter of opening 35 being less than the diameter of ball 34 so that the ball cannot pass through the opening, but the diameter is sufficiently large that the ball extends through leaf spring 30 and can be brought into engagement with rotating cam 12, as shown in FIG. 2.

In the normal rest position of FIG. 1, leaf spring 30 supports the elastic column means and table 18 in such a position that ball 34 is slightly above and out of contact with rotating cam 12. Thus, leaf spring 30 serves normally to hold the elastic column means away from the rotating cam. Downward pressure on the elastic column causes the column to compress in an axial direction and deflects spring 30 sufficiently that ball 34 is brought into contact with cam 12, as in FIG. 2.

Once ball 34 is in contact with cam 12, rotation of the cam imparts intermittent movement to the elastic column and to the table 18 to vibrate the table and any load thereon. Any downward force on the table in excess of that required to bring ball 34 into light initial contact with the cam 12 causes compression of the turns of spring 25. This causes the elastic column means to become in effect more rigid and to transmit an increasing amount of force to table 18, thereby imparting a greater amplitude of vibration to the table.

Upward motion is transmitted to the elastic column from the rotating cam through ball 34. Leaf spring 30 is not involved in the transmission of this upward motion, although the spring moves up and down because of its own resiliency and cushions the return or down stroke of the column and table.

When ball 34 is in contact with cam 12, it turns within socket 33 and also rolls on the cam. It is desirable that a source of lubricant be provided, and this is easily accomplished by providing a small axial bore centrally of stem 27 in which is placed wick 38. This wick may be saturated with a thin lubricating oil which is transferred to ball 34 by contact therewith.

The weight of the elastic column and table 18, as well as any load on the table, is transmitted to ball 34 and keeps the ball seated in opening 35 in the leaf spring. The depth of socket 33 in stem 27 is such that the stem preferably does not, but almost, engage the upper surface of the leaf spring. Thus, the sidewalls of the socket act to confine the ball laterally and prevent its displacement from opening 35.

DESCRIPTION OF VARIATIONAL EMBODIMENTS

Various changes in the construction of the elastic column and of the anti-friction means at the base of the column are possible within the scope of the present invention. One such variation is shown in FIG. 3 in which it will be seen that the stem supporting table 18 is made in two telescoping sections, 26 and 40. The upper stem section 26 is resiliently supported by spring 41 which is contained in bore 42 within lower stem section 40. Coil spring 41 bears at its two opposite ends against the two stem sections 26 and 40 to urge them apart and normally keep the stem in the extended position.

At the lower end of stem section 40, there is provided socket 43 in which is contained ball 34. It will be noted that the lower edges of the stem are deformed, as by spinning or other similar operation, to provide a constriction at the lower end or mouth of socket 43 having a diameter less than the diameter of ball 34. This construction holds the ball within socket 43 against displacement from the stem or seat opening 35. A wick 38 may be provided to lubricate ball 34.

Ball 34 is preferably loosely confined in socket 43, the lip 43a of the opening to the socket being of such a dimension that a limited vertical movement of ball 34 within socket 43 is permitted. This allows the ball to turn freely within the socket to reduce friction between it and cam 12 or the walls of the socket, as well as to be better lubricated by virtue of the relative movement of the ball with respect to wick 38.

FIG. 4 illustrates another possible variation in which the stem supporting table 18 is again composed of two telescoping parts, 45 and 46, that slidably engage one another. Around the small diameter portion of stem section 45 is coil spring 48. Spring 48 bears at its opposite ends against oppositely facing shoulders provided on the two stem sections 45 and 46, respectively.

Lower stem section 45 is provided at its lower end with recess 49 within which is located ball 34. The ball 34 is held in the recess by retaining ring 50 which is screw-threaded, or otherwise attached to the lower end of stem section 45. Retaining ring 50 is provided with a central opening having a minimum diameter of less than the diameter of ball 34 so that the ball is confined within socket 49 and against lateral displacement from seat 35.

Socket 49 has an annular recess in the socket wall near its inner end, in which is seated elastic ring 51. This ring may be of rubber or other similar elastic material and is located at a position such that ball 34 comes into contact with ring 51 rather than with the wall of recess 49 when a load is imposed on the elastic column. Ring 51, being elastic, cushions the shock of the motion transmitted from cam 12 through ball 34 to the elastic column means. This has been found to be especially beneficial when the ball is first brought into contact with the rotating cam to compact investment material around a pattern, as mentioned in my patent referred to above. Before the investment material has been consolidated around the pattern, it is possible for the pattern to become dislocated if the flask and pattern are vibrated too vigorously. The most satisfactory technique is to vibrate the flask gently at first, gradually increasing the intensity and amplitude of vibration to the maximum degree possible of the apparatus. Interposition of the elastic ring 51 between ball 34 and the stem supporting the table serves to limit at all times the intensity of the vibration and especially to reduce greatly the danger of initially vibrating the table sufficiently that the pattern can become dislocated.

A further embodiment of the invention is illustrated in FIG. 5 wherein the stem supporting table 18 is again composed of two telescoping sections 54 and 55 which slidably engage each other. Lower stem section 55 is provided at some position intermediate its ends with an enlarged diameter section or collar 56. Between the upper face of collar 56 and the lower end face of upper stem section 54 is interposed a first coil spring 57. Below the lower face of collar 56 is a second coil spring 58 which rests at its lower end against the upper face of the spring 30. The lower end of stem section 55 is provided with socket 60 in which ball 34 is located. The recess is likewise provided with elastic ring 51.

With this construction, vibrating motion is transmitted to table 18 chiefly through spring 57. Spring 58 may be a relatively weak spring, its chief purpose being to act as a cage which surrounds the lower stem section and ball 34 to confine the ball laterally and prevent its displacement from seat 35 in spring 30. Spring 58 supports the weight of the elastic column and table when at rest. The participation of spring 58 in supporting the superimposed weight and also transmitting motion to the table during vibration of the table can be regulated by the strength of spring 58 in comparison with the strength of spring 57.

From the foregoing description, it will be apparent that various changes may be made in the construction of the elastic column supporting the table and the anti-friction means carried by the column. For example, the amplitude of table movement can be varied to suit conditions. Various such modifications of the invention have been illustrated herein as examples, but it is to be understood that the invention is not necessarily considered as being limited thereto, since other changes in construction may occur to persons skilled in the art within the spirit and scope of the present invention.

I claim:
1. In a vibrating table construction having a table, a rotating cam, and elastic column means transmitting motion from the cam to the table, the combination with said elastic column means of a ball received in a socket in the column means, and a leaf spring having seat means engaging the ball to support the column means, the ball projecting beyond the leaf spring to engage the rotating cam.

2. In a vibrating table construction as in claim 1, the combination that also includes an oil wick at the base of the socket and contacting the ball to lubricate the ball.

3. In a vibrating table construction as in claim 1, the combination that also includes a resilient ring in the socket and engaged by the ball to transmit motion to the elastic column means.

4. In a vibrating table construction as in claim 1, the combination in which the seat means comprise an opening through the leaf spring having a diameter less than the diameter of the ball.

5. In a vibrating table construction as in claim 1, the combination which also includes means restricting the mouth of the socket to retain the ball in the socket.

6. In a vibrating table construction as in claim 1 the combination that also includes a coil spring bearing against the leaf spring and the column means and surrounding the ball to confine the ball to said seat means.

7. A vibrating table construction having a table, a rotating cam, and an elastic column supporting the table and transmitting thereto motion from the cam, the axis of the column means being upright, in which:
the column means comprises a pair of telescoping members slidably engaging each other and resilient means urging the telescoping members apart, the lower member having a socket in its lower end,
and which also includes
a ball in said socket
and a leaf spring below and supporting the column means, the leaf spring having an opening providing a seat for the ball with the ball projecting below the leaf spring for engagement by the cam upon downward deflection of the leaf spring from a normal rest position.

8. A vibrating table construction as in claim 7 that also includes
an elastic pad in the socket engageable by the ball to cushion the transmission of movement from the cam through the ball to the elastic column means.

9. A vibrating table construction as in claim 8 that also includes
an oil wick at the base of the socket and extending into engagement with the ball when raised into the socket to the maximum extent.

References Cited

UNITED STATES PATENTS

| | | | |
|---|---|---|---|
| 991,381 | 5/1911 | Simmers | 259—91 |
| 1,947,398 | 2/1934 | Stuhler | 259—91 |
| 2,788,677 | 4/1957 | Hayek | 74—569 |
| 2,883,865 | 4/1959 | Lyman | 74—569 X |
| 3,211,432 | 10/1965 | Rossem | 259—91 |

ROBERT W. JENKINS, Primary Examiner

U.S. Cl. X.R.
74—569